Sept. 28, 1954  K. KALTENBACH  2,690,012
INSTRUMENT FOR GRINDING, POLISHING, DRILLING
AND MILLING FOR DENTAL AND MEDICAL PURPOSES
Filed Jan. 7, 1952
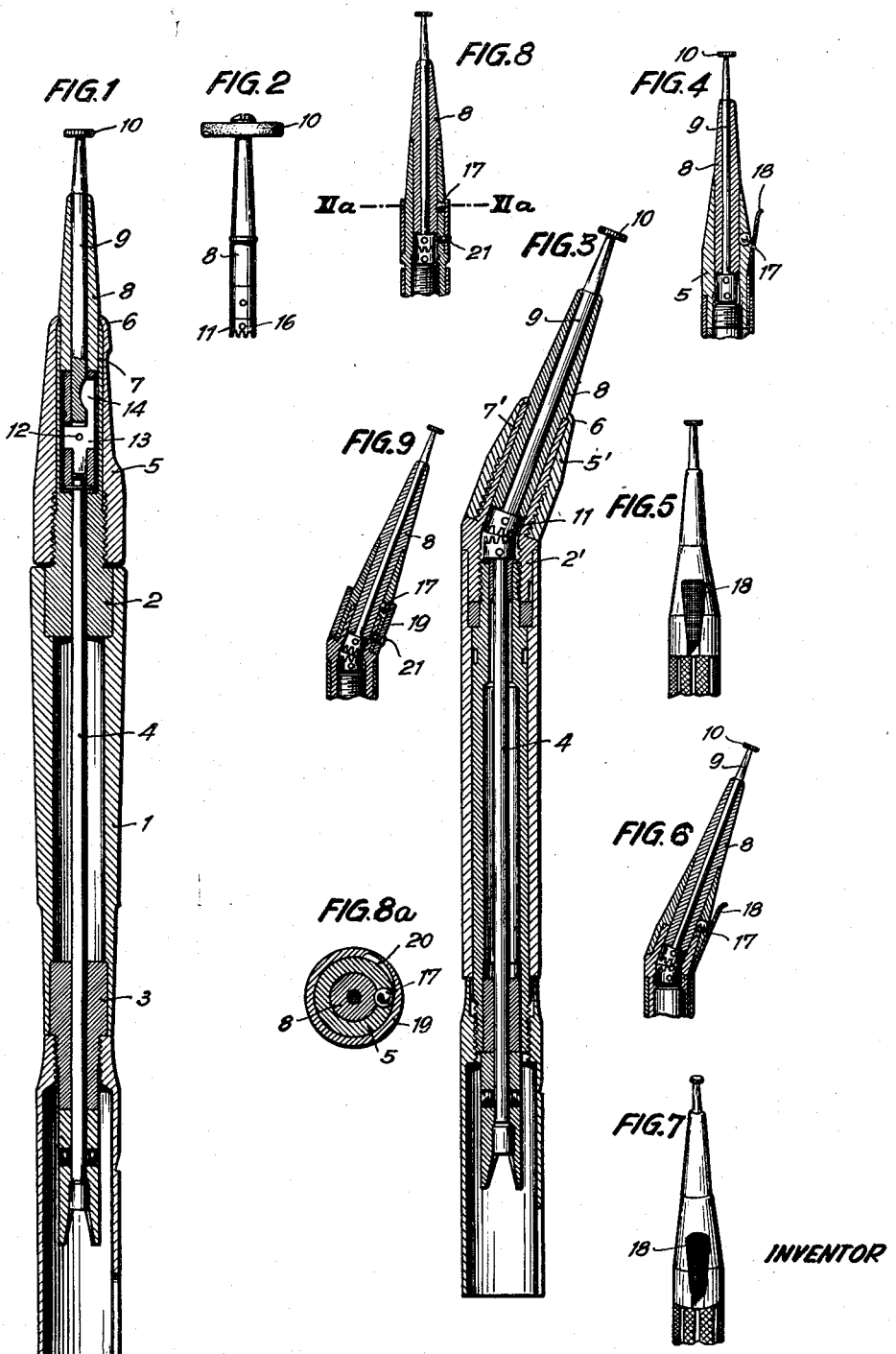
INVENTOR
K. Kaltenbach
ATTORNEYS Patented Sept. 28, 1954

2,690,012

UNITED STATES PATENT OFFICE 2,690,012

INSTRUMENT FOR GRINDING, POLISHING, DRILLING, AND MILLING FOR DENTAL AND MEDICAL PURPOSES

Kurt Kaltenbach, Biberach-Riss, Germany

Application January 7, 1952, Serial No. 265,236

Claims priority, application Germany January 18, 1951

6 Claims. (Cl. 32—27)

This invention relates to an instrument for grinding, polishing, drilling and milling for dental and medical purposes.

It has hitherto been the practice to insert the tools with the aid of a long shank into the forward end of a hand piece and to grip the shaft by means of one of the chucks of a known construction provided in the forward end of the hand piece. In such an arrangement the shank of the tool projects far out of the forward end of the hand piece, so that a certain knocking of the tool is inevitable.

It has also been proposed to mount a tool shank of short construction, which is provided at its rear end with a pinion and is surrounded by a short guiding sleeve, in the forward end of hand or angle pieces. Even with such a construction of the instruments it is not possible, owing to the short guide of the tool shank, to ensure smooth running of the tools, such as is specially necessary for grinding work.

According to the invention it is proposed to surround the tool for grinding, polishing, drilling or milling, the arbor or shank of which is provided at its rear end with a coupling part for establishing connection with a corresponding coupling part of the connecting shaft in the instrument, with an elongated guiding bearing which extends from the coupling part to as near the tool as possible and can be inserted into the forward end of a hand piece containing the driving shaft, so as to be capable of being secured therein. In this way perfectly smooth running of the tool without any knocking is ensured.

Preferably, the coupling part at the rear shank end of the tool is releasably connected with the shank. For this purpose there may be rockably supported in the rear slotted end of the guiding bearing for the tool shank a two-armed lever, the forward lever arm of which engages with a projecting lug in a corresponding recess of the drill shank, when the two-armed lever is swung over into the slot of the guiding bearing. After the tool shank provided with the guiding bearing has been slipped into the handpiece, any rocking motion and consequent unintentional release of the tool shank in the guiding bearing is impossible.

Preferably, the coupling parts consist of gear wheels of the kind frequently employed in the dental instrument industry.

The locking of the guiding bearing for the tool shank or arbor may be effected by means of the removable forward end of the gripping sleeve of the hand piece which is made to screw on to forward bearing of the driving shaft.

The forward bearing of the driving shaft may also be constructed as an elbow piece, in which case the coupling parts in the form of gear wheels will engage in one another in the angle of the elbow piece.

A particularly reliable locking of the guiding bearing for the tool shank in the instrument may be effected, if the forward bearing of the driving shaft, which in the forward slotted part receives the bearing for the shank of the tool, be made to extend to the forward conical end of the screwed-on handle point, so that, on the handle point being screwed up tightly, a clamping of the guiding bearing for the shank of the tool by the slotted forward end of the forward bearing for the driving shaft takes place.

According to the invention the locking of the guiding bearing for the shank of the tool can also be effected by a ball supported in an aperture extending through the forward removable end of the holding sleeve, the said ball being pressed radially inwards by means of a leaf spring which is attached to said forward end of the holding sleeve and presses against the exposed outer surface of the ball, so that after the guiding bearing has been completely inserted into the forward end of the hand piece and turned into a suitable position, the ball snaps into a recess in the said guiding bearing.

Preferably, the spring acting on the ball has the form of a leaf spring, the rear part of which is fixed inside the holding sleeve, whilst the forward exposed part of the spring, which bears against the ball, is formed on the outside so as to serve the purpose of a finger rest.

A particularly effective locking of the guiding bearing for the tool shank in the instrument may be realised by the ball supported in an aperture extending through the forward end of the holding sleeve being covered to the outside by a rotatable ring, the inner surface of which has an eccentric track for the ball, so that by turning the ring between two stops a tight clamping of the tool shank by means of the ball may be effected.

In the accompanying drawing are illustrated by way of example different constructional forms of the instrument constructed according to the invention for grinding, polishing, drilling and milling for dental and medical purposes.

Fig. 1 shows an instrument constructed as a hand piece with an inserted grinding tool in longitudinal section, Fig. 2 the grinding tool with the guiding bearing and a gear wheel at the rear end of the shank in side view, Fig. 3 an instrument formed as an angle piece with inserted grinding tool in longitudinal section, Fig. 4 the forward end of the hand piece with inserted grinding tool and a modified form of locking device in longitudinal section, Fig. 5 the constructional form according to Fig. 4 in side view, Fig. 6 the forward end of an angle piece with inserted grinding tool and a locking device according to Figs. 4 and 5, in longitudinal section, Fig. 7 the same part in side view, Fig. 8 the forward part of a hand piece with inserted grinding tool and a modified form of locking device in longitudinal section, Fig. 8a a section on line XIa—XIa of Fig. 8 to a larger scale and Fig. 9 the forward end of an angle piece with the locking arrangement according to Figs. 8 and 8a in longitudinal section.

In the constructional form of a hand piece with inserted grinding tool, according to Fig. 1, 1 is the hand piece sleeve, which at the forward and rear end has bearings 2, 3 for the support of the driving shaft 4. On the forward bearing 2 is screwed a holding point 5, to the forward, conically tapering end 6 of which there extends the thin-walled, slotted extension part 7 of the forward bearing 2. Into the slotted extension part 7 is inserted the rear part of the elongated guiding bearing 8 for the arbor or shank 9 of the grinding tool 10. The guiding bearing 8 extends from the rear end of the long arbor or shank 9 into the vicinity of the tool 10, so that a long, steady and sole support for the arbor or shank 9 substantially throughout its length is assured. To the rear end of the shank 9 is fixed a gear wheel 11 which after the insertion of the guiding bearing 8 into the instrument enters into engagement with a corresponding gear wheel at the forward end of the driving shaft 4. The tool 10 is carried on the outer end of the arbor or shank 9 which latter projects slightly beyond the bearing so that the tool is positioned in proximity to the adjacent end of the bearing.

After the insertion of the guiding bearing 8 into the holding point 5 it is only necessary for the latter to be tightened up by screwing it on the forward bearing 2. By the forward conical end 6 the parts of the slotted sleeve 7 are forced inwards and at the same time the guiding bearing 8 is in this way locked. All that is required for releasing the guiding bearing 8 is to screw back the holding point 5 a little, whereupon the guiding bearing 8 can be withdrawn from the holding point 5.

Should it be decided to forego the easy releasability of the gear wheel 11 from the tool shank 9, the gear wheel 11 may be connected with the rear end of the shank 9 in a known manner by means of a transverse pin 16 (see Fig. 2).

In Fig. 3 is shown the application of the idea underlying the invention to an angle piece, the locking of the guiding bearing 8 for the shank 9 of the tool 10 being effected in the same way as in the constructional form according to Figs. 1 and 2. In this constructional form the forward bearing 2' of the driving shaft 4 has the form of an elbow part and the gear wheels of the shank 9 and the driving shaft 4 mesh with one another in the angle of this elbow part. In this constructional form as well the forward end 5' of the holding sleeve is screwed on to the cranked part of the forward driving bearing 2'. The forward end 6 is conically tapered inwards, so that, on the part 5' being tightened up, the slit ends 7' of the forwardly extended bearing 2' forming part of the elbow are pressed from the outside against the guiding bearing 8 and clamp the latter.

In the constructional form according to Figs. 4 and 5 the locking of guiding bearing 8 for the shank 9 of the tool 10 is effected by means of a ball 17 which is held in an aperture extending through the forward end of the holding sleeve 5 and on which presses from the outside a leaf spring 18, the rear end of which is fixed inside the holding sleeve 5. The guiding bearing 8 is provided at a corresponding distance from its end at its periphery with a recess fitting the ball 17, so that, after the guiding sleeve 8 has been pushed in till the gear wheels mesh with one another and after the guiding bearing has been turned into the correct position, the spring 18 will cause the ball 17 to enter the corresponding recess at the periphery of the guiding bearing 8, so that the guiding bearing 8 will be locked in its inserted position.

As will be seen from Fig. 5, the forward, exposed end of the spring 18 is made in the form of a finger rest. When the instrument is in use, an unintentional release of the locked engagement is effectively prevented by the finger bearing against this rest.

Figs. 6 and 7 show in corresponding illustrations the same locking device by means of ball 17 and spring 18 for an angle piece, into the cranked, forward part of which, just as in Figs. 4 and 5, the guiding bearing 8 with the tool shank 9 and the tool 10 is inserted so as to be capable of being locked in position.

In the constructional form according to Figs. 8 and 8a the locking of the guiding bearing 8 inserted in the forward end of a hand piece is again effected by means of a ball 17 which is in this case again supported in an aperture extending through the forward end of the holding sleeve 5. Against falling out of the aperture the ball 17 is secured by a rotatable ring 19. On the inner surface of the rotatable ring 19 there is provided an eccentric path 20 for the ball 17, which extends round a portion of the internal surface of the ring 19. With the rotatable ring 19 in the position shown in Fig. 8a the ball 17 is forced to the furthest extent inwards, so that it enters from the outside into a corresponding depression of the guiding bearing 8 and in this way locks the latter with the hand piece. On the rotatable ring 19 being turned in the clockwise sense, the ball 17 can move slightly outwards on the eccentric path 20, causing the locking with the guiding sleeve 8 to be released and enabling the guiding bearing together with the tool shank to be withdrawn out of the hand piece.

Against axial displacement the rotatable ring 19 is secured by means of a screw 21 which enters through the ring into a corresponding groove at the periphery of the forward end of the holding sleeve 5. The rotary motion of the ring 19 is limited by stops which are determined by the ends of the groove in the holding sleeve 5, in which the screw 21 engages.

Thus, in this constructional form the locking and unlocking may be performed in a simple manner by turning the ring 19.

Fig. 9 shows the application of the locking device according to Figs. 8 and 8a to a hand piece which is cranked at its forward end.

I claim:
1. An instrument for grinding, polishing, drilling and milling, more particularly for dental and medical purposes, comprising the combination of a hand piece having a driving shaft rotatable therein, said driving shaft having a drive element thereon, and a tubular extension on the forward end of the hand piece having a smooth inner wall, with a tool unit comprising a long guiding bearing for insertion into said tubular extension of the hand piece and adapted to extend outwardly therefrom when inserted, a tool arbor rotatable in said guiding bearing, a tool on the forward end of said arbor in proximity to the forward end of the guiding bearing, a drive element on the tool arbor in proximity to the rear end of the guiding bearing for co-operation with the drive element on said driving shaft, and retaining means on the hand piece for securing the guiding bearing in position thereon.

2. An instrument for grinding, polishing, drilling and milling, more particularly for dental and medical purposes, comprising the combination of a hand piece having a rotatable driving shaft therein, forward and rear bearings for said driving shaft within the hand piece, a drive element on said driving shaft and a thin-walled, slotted tubular extension on the forward bearing of the driving shaft, with a tool unit comprising a long guiding bearing for insertion into said tubular extension and adapted to extend outwardly therefrom when inserted, a tool arbor rotatable in said guiding bearing and having a tool thereon and a drive element for co-operation with the drive element on the driving shaft located in proximity to the forward and rear ends of the guiding bearing, respectively, and a sleeve screwed on the forward bearing of the driving shaft and encircling said tubular extension.

3. An instrument for grinding, polishing, drilling and milling, more particularly for dental and medical purposes, comprising the combination of a hand piece having a rotatable driving shaft therein, forward and rear bearings for said driving shaft within the hand piece, a tubular elbow piece integral with said forward bearing and extending outwardly from the hand piece, a drive element on the forward end of said driving shaft located at the angle of the elbow piece, with a tool unit comprising a long guiding bearing for insertion into said elbow piece and adapted to extend outwardly therefrom when inserted, a tool arbor rotatable in said guiding bearing, a tool on said arbor in proximity to the forward end of the guiding bearing, a drive element on the arbor in proximity to the rear end of the guiding bearing for co-operation with the drive element on the driving shaft, and retaining means on the elbow piece for securing the guiding bearing in position therein.

4. An instrument for grinding, polishing, drilling and milling, more particularly for dental and medical purposes, comprising the combination of a hand piece having a rotatable driving shaft therein, a drive element on the forward end of said shaft, a forward bearing for said driving shaft within the hand piece with an integral tubular extension having a smooth inner wall and with a radial aperture therein, with a tool unit comprising a long guiding bearing for insertion into said tubular extension and adapted to extend outwardly therefrom when inserted, a tool arbor rotatable in said guiding bearing and having a tool thereon and a drive element for co-operation with the drive element on the driving shaft located in proximity to the forward and rear ends of the guiding bearing, respectively, said guiding bearing having a recess therein adapted to register with the aperture in the tubular extension, a ball in said aperture and spring means on the tubular extension for urging the ball radially inwards to engage said recess when the guiding bearing is inserted in the tubular extension, so as to secure the guiding bearing in position therein.

5. An instrument for grinding, polishing, drilling and milling, more particularly for dental and medical purposes, comprising the combination of a hand piece having a tubular extension on the forward end thereof with a smooth inner wall, said tubular extension having a radial aperture therein, a driving shaft rotatable in said hand piece and having a drive element on the forward end thereof, with a tool unit comprising a long guiding bearing for insertion into said tubular extension and adapted to extend outwardly therefrom when inserted, said guiding bearing having a recess therein adapted to register with the aperture in the tubular extension, a tool arbor rotatable in said guiding bearing and having a tool thereon and a drive element for co-operation with the drive element on the driving shaft located in proximity to the forward and rear ends of the guiding bearing, respectively, a ball in said aperture and a ring rotatable around said tubular extension and the internal surface of which has an eccentric path which bears against said ball, so that after the guiding bearing has been inserted in the tubular extension and the recess therein brought into register with the aperture in the tubular extension the ball can be forced into said recess by turning the ring to secure the guiding bearing in position.

6. A tool unit for grinding, polishing, drilling and milling, more particularly for dental and medical purposes, comprising an elongated guiding bearing, a tool arbor rotatable in said guiding bearing and solely supported substantially throughout its length therein and having one end projecting slightly therebeyond, a tool directly carried on the projecting end of said arbor in proximity to the adjacent end of the guiding bearing, and a drive element on the tool arbor in proximity to the opposite end of the guiding bearing.

References Cited in the file of this patent
UNITED STATES PATENTS

| Number | Name | Date |
| --- | --- | --- |
| 1,465,690 | Smith | Aug. 21, 1923 |
| 1,638,175 | Terry | Aug. 9, 1927 |